B. J. HUBBARD.
MIRROR FOR AUTOMOBILES.
APPLICATION FILED SEPT. 7, 1920.
1,380,910.
Patented June 7, 1921.
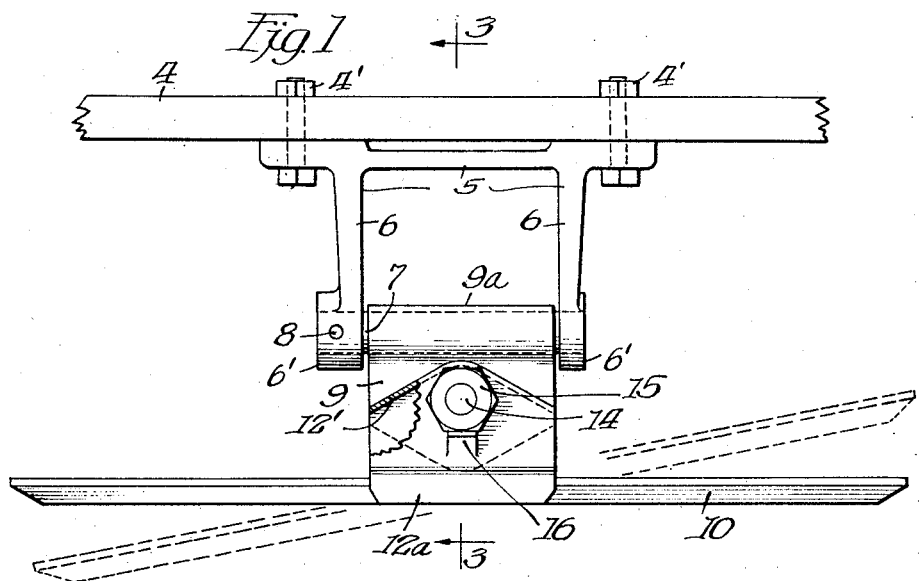
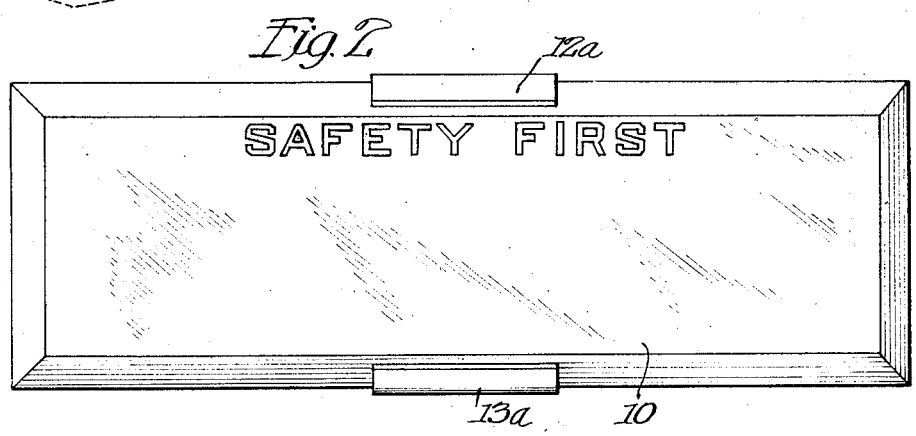
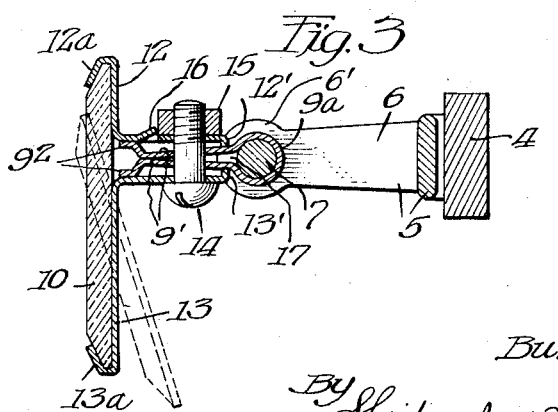
Inventor:
Burtt J. Hubbard,
By Sheridan, Jones, Sheridan & Smith.
Attys.

UNITED STATES PATENT OFFICE.

BURTT J. HUBBARD, OF KOKOMO, INDIANA.

MIRROR FOR AUTOMOBILES.

1,380,910.  Specification of Letters Patent.  Patented June 7, 1921.

Application filed September 7, 1920. Serial No. 408,543.

*To all whom it may concern:*

Be it known that I, BURTT J. HUBBARD, a citizen of the United States, residing at Kokomo, in the county of Howard and State of Indiana, have invented certain new and useful Improvements in Mirrors for Automobiles, of which the following is a specification.

This invention relates to improvements in automobile mirrors of that type usually attached to the frame of the windshield or other suitable place so that the driver can see therein a reflection of on-coming vehicles and thus avoid accidents therewith and also to enable him to reduce the likelihood of collision while turning corners.

The principal object of this invention is to provide a mirror with improved and simple vertical and horizontal adjusting means whereby said mirror may be moved into operative position even when the windshield upon which it is mounted is in a horizontal position, and which may be tightened or disassembled by turning but a single screw. Other objects relate to various features of construction and arrangement which will appear more fully hereinafter.

The nature of the invention will be understood from the following specification taken with the accompanying drawings, in which—

Figure 1 is a plan view of my mirror and adjusting mechanism;

Fig. 2 is a front elevation of the same; and

Fig. 3 is a sectional view taken on the line 3—3 of Fig. 1.

Like numerals designate like elements throughout the drawings wherein 4 is a windshield frame or other portion of an automobile, shown diagrammatically, to which by means of screws 4' is secured the supporting bracket 5 of my device having two horizontally extending standards 6 which are slightly enlarged at their outer ends 6' to strengthen the same, and are recessed to receive shaft 7 which is non-rotatably held in said recesses by pin 8. A vertically-adjusting band 9 is formed from a flat piece of resilient material bent with its center portion forming a hollow cylinder $9^a$ of slightly less diameter than the shaft 7. The ends of the band 9 extend outwardly from the cylindrical portion thereof in leaf like projections 9' having substantially parallel relation. The ends of the lower and upper leaves 9' are similarly formed in that each is slightly bent outwardly and forwardly as at $9^2$ (see Fig. 3) in such manner that the lateral surface of the upper and lower leaves at the outer ends thereof lie in parallel planes when the said band is in operative position.

I provide upper and lower laterally adjusting members 12 and 13, respectively, each being formed of flat metal having generally the form of a right angle, as shown in Fig. 3, the vertical portion of each member having a hooklike fold $12^a$ and $13^a$ of members 12 and 13, respectively, to engage the mirror 10.

In the drawing a rectangular bevel edge mirror 10 is shown but it will be understood that the principle hereby disclosed is applicable to a mirror of any design.

The horizontal portions of the laterally adjusting members 12 and 13 are rounded slightly at their inner ends as shown to provide clearance with the cylindrical portion $9^a$, and the forward ends of the horizontal leaves of the vertically-adjusting member are likewise formed to provide clearance for the mirror when the same is adjusted laterally.

The horizontal portions of the upper and lower horizontally adjusting members 12 and 13 have downwardly and upwardly bent flanges 12' and 13', respectively, which, when the device is in assembled relation, co-act with the horizontal surfaces 9' and $9^2$ of vertically-adjusting band 9 by bearing against the upper and lower surfaces of the said vertically-adjusting member to maintain said horizontally-adjusting members 12 and 13 in proper relation.

A bolt 14 extends through registering holes in the upper and lower leaves of the vertically-adjusting member 9 and in the horizontal portions of the laterally adjusting members 12 and 13 and is engaged by nut 15. An up-struck lug 16 in the upper laterally-adjusting member 12 prevents the nut from rotating when the screw is turned.

The diameter of the cylindrical portion $9^a$ of the vertically-adjusting member being of less diameter than the shaft 7, when the former is in operative position on said shaft will be slightly expanded and leave a clearance as at 17 for compression of said member when the same is tightened to prevent the downward movement of the mirror.

It will be seen therefore that the turning of the screw 14, which may be one adapted for being turned without the aid of any tool, will effect a tightening of the vertically-adjusting member 9 by producing a compression of the cylindrical portion $9^a$ upon the shaft 7, and also that the laterally-adjusting members 12 and 13 will be tightened by being drawing into greater frictional contact with said vertically-adjusting member through parts $9^2$ of the latter member and parts $12^1$ and $13^1$ of the upper and lower leaves of said laterally adjusting members.

Although I have shown and described one form of my device, it is obvious that various modifications and improvements may be made therein without departing from the scope of my invention as defined in the following claims.

I claim:—

1. In a device of the class described, a supporting bracket, a shaft secured thereto, a mirror, a vertically adjusting band secured to said shaft, laterally adjusting members engaging said mirror, and means for simultaneously tightening said laterally adjusting members on said vertically adjusting band and said vertically adjusting band on said shaft.

2. In a device of the class described, a supporting bracket, a shaft secured thereto, a mirror, a vertically adjusting band secured to said shaft, laterally adjusting members engaging said mirror and adjustably secured to said band, and means for simultaneously tightening said laterally adjusting members on said mirror and on said band.

3. In a device of the class described, a supporting bracket having a pair of horizontally disposed standards, a shaft supported thereby, a vertically-adjusting member frictionally engaging said shaft, an upper and lower laterally adjusting member engaging said vertically-adjusting member and engaging opposite edges of said mirror, a screw extending through all of said adjusting members to secure the same in operative relation, and a mirror carried by said laterally-adjusting members.

4. In a device of the class described, a supporting bracket adapted to be mounted on the wind-shield of an automobile, said bracket having two horizontally disposed standards, a shaft extending between said standards adjacent the ends thereof and non-rotatably secured thereto, a vertically-adjusting member adapted to frictionally engage said shaft, a mirror, laterally adjusting members adapted to engage said mirror and to co-act with said vertically-adjusting member to hold said mirror in adjustable position on said bracket, registering holes in said adjusting members, and a screw extending through said holes by which said laterally adjusting member may be drawn into greater frictional contact with said vertically-adjusting member simultaneously with the increase of frictional contact of said latter member with said shaft.

5. In a device of the class described a supporting bracket, a shaft carried thereby, an adjusting band engaging said shaft and having its end spaced apart, a mirror, laterally adjusting members engaging said mirror and overlying said ends and frictionally engaging said band adjacent said shaft, and means for tightening said laterally adjusting members on said band and said band on said shaft.

In testimony whereof, I have subscribed my name.

BURTT J. HUBBARD.